US012040170B2

(12) United States Patent
Bern

(10) Patent No.: US 12,040,170 B2
(45) Date of Patent: Jul. 16, 2024

(54) METHODS AND APPARATUSES FOR DECONVOLUTION OF MASS SPECTROMETRY DATA

(71) Applicant: Protein Metrics, LLC, Boston, MA (US)

(72) Inventor: Marshall Bern, San Carlos, CA (US)

(73) Assignee: Protein Metrics, LLC, Boston, MA (US)

( * ) Notice: Subject to any disclaimer, the term of this patent is extended or adjusted under 35 U.S.C. 154(b) by 0 days.

(21) Appl. No.: 18/309,727

(22) Filed: Apr. 28, 2023

(65) Prior Publication Data

US 2023/0268168 A1 Aug. 24, 2023

Related U.S. Application Data

(63) Continuation of application No. 16/562,329, filed on Sep. 5, 2019, now Pat. No. 11,640,901.

(60) Provisional application No. 62/727,411, filed on Sep. 5, 2018.

(51) Int. Cl.
*H01J 49/00* (2006.01)

(52) U.S. Cl.
CPC ................................ *H01J 49/0036* (2013.01)

(58) Field of Classification Search
CPC .................................................. H01J 49/0036
See application file for complete search history.

(56) References Cited

U.S. PATENT DOCUMENTS

| | | | |
|---|---|---|---|
| 4,464,650 | A | 8/1984 | Eastman et al. |
| 4,558,302 | A | 12/1985 | Welch |
| 4,814,764 | A | 3/1989 | Middleton |
| 5,343,554 | A | 8/1994 | Koza et al. |

(Continued)

FOREIGN PATENT DOCUMENTS

| | | | |
|---|---|---|---|
| GB | 2401721 A * | 11/2004 | .......... H01J 49/0009 |
| JP | 2004317509 A * | 11/2004 | .......... H01J 49/0009 |

(Continued)

OTHER PUBLICATIONS

"Parsimonious Charge Deconvolution for Native Mass Spectrometry" Marshall Bern; Journal PROTEOME, pp. 1216-1226 (Year: 2018).*

(Continued)

*Primary Examiner* — Michael J Dalbo
*Assistant Examiner* — Kaleria Knox
(74) *Attorney, Agent, or Firm* — Shay Glenn LLP

(57) ABSTRACT

Methods and apparatuses for the identification and/or characterization of properties of a sample using mass spectrometry. Methods may include analyzing spacings between mass-to-charge ratio peaks from measured mass spectrum data, identifying and associating the spacings with mass delta values corresponding to masses of possible constituents of a molecule within the sample, calculating estimated charges of molecular species within the sample based on the spacings and mass delta values, and deconvoluting the measured mass spectrum data based on the estimated charges to provide a neutral mass spectrum. The methods and apparatuses (including software) described herein may result in more accurate characterization of peaks within the neutral mass spectrum, less false peaks within the neutral mass spectrum, and less noise in the neutral mass spectrum.

20 Claims, 9 Drawing Sheets

(56) References Cited

U.S. PATENT DOCUMENTS

| | | | | |
|---|---|---|---|---|
| 5,910,655 | A * | 6/1999 | Skilling | H01J 49/0027 250/281 |
| 5,995,989 | A | 11/1999 | Gedcke et al. | |
| 6,094,627 | A | 7/2000 | Peck et al. | |
| 6,393,393 | B1 | 5/2002 | Kawahara | |
| 6,535,555 | B1 | 3/2003 | Bordes et al. | |
| 6,798,360 | B1 | 9/2004 | Qian et al. | |
| 6,906,320 | B2 | 6/2005 | Sachs et al. | |
| 7,006,567 | B2 | 2/2006 | Frossard et al. | |
| 7,283,684 | B1 | 10/2007 | Keenan | |
| 7,283,937 | B2 | 10/2007 | Goldberg | |
| 7,297,940 | B2 | 11/2007 | Bern | |
| 7,397,961 | B2 | 7/2008 | Keeney et al. | |
| 7,400,772 | B1 | 7/2008 | Keenan | |
| 7,402,438 | B2 | 7/2008 | Goldberg | |
| 7,429,727 | B2 | 9/2008 | Bern | |
| 7,496,453 | B2 | 2/2009 | Chau | |
| 7,680,670 | B2 | 3/2010 | Lamblin et al. | |
| 7,979,258 | B2 | 7/2011 | Goldberg et al. | |
| 8,004,432 | B2 | 8/2011 | Kawato | |
| 8,023,750 | B2 | 9/2011 | Raveendran et al. | |
| 8,077,988 | B2 | 12/2011 | Donoho | |
| 8,108,153 | B2 | 1/2012 | Bern | |
| 8,428,889 | B2 | 4/2013 | Wright | |
| 8,511,140 | B2 | 8/2013 | Gorenstein et al. | |
| 8,598,516 | B2 | 12/2013 | Sapargaliyev et al. | |
| 8,645,145 | B2 | 2/2014 | Subbaraman et al. | |
| 9,385,751 | B2 | 7/2016 | Kletter | |
| 9,571,122 | B2 | 2/2017 | Kletter | |
| 9,640,376 | B1 | 5/2017 | Becker et al. | |
| 9,859,917 | B2 | 1/2018 | Kletter | |
| 10,199,206 | B2 | 2/2019 | Becker et al. | |
| 10,354,421 | B2 | 7/2019 | Becker et al. | |
| 10,510,521 | B2 | 12/2019 | Kil et al. | |
| 10,546,736 | B2 | 1/2020 | Bern et al. | |
| 10,665,439 | B2 | 5/2020 | Bern | |
| 10,879,057 | B2 | 12/2020 | Kil et al. | |
| 10,991,558 | B2 | 4/2021 | Bern et al. | |
| 11,127,575 | B2 | 9/2021 | Bern | |
| 11,276,204 | B1 | 3/2022 | Kletter | |
| 11,289,317 | B2 | 3/2022 | Kil et al. | |
| 11,346,844 | B2 | 5/2022 | Nichols et al. | |
| 11,626,274 | B2 | 4/2023 | Bern et al. | |
| 11,640,901 | B2 | 5/2023 | Bern | |
| 2002/0068366 | A1 | 6/2002 | LaDine et al. | |
| 2003/0031369 | A1 | 2/2003 | Le Pennec et al. | |
| 2003/0200032 | A1 | 10/2003 | Keating et al. | |
| 2003/0218634 | A1 | 11/2003 | Kuchinsky et al. | |
| 2004/0102906 | A1 | 5/2004 | Roder | |
| 2004/0160353 | A1 | 8/2004 | Cirillo et al. | |
| 2005/0047670 | A1 | 3/2005 | Qian et al. | |
| 2005/0063864 | A1 | 3/2005 | Sano et al. | |
| 2005/0276326 | A1 | 12/2005 | Drezner | |
| 2008/0010309 | A1 | 1/2008 | Sugita | |
| 2008/0025394 | A1 | 1/2008 | Francois et al. | |
| 2008/0260269 | A1 | 10/2008 | Thiagarajan | |
| 2009/0012931 | A1 | 1/2009 | Appa et al. | |
| 2009/0052528 | A1 | 2/2009 | Jeon et al. | |
| 2009/0179147 | A1 | 7/2009 | Milgram et al. | |
| 2010/0124785 | A1 | 5/2010 | Bern | |
| 2010/0288917 | A1 | 11/2010 | Satulovsky et al. | |
| 2010/0288918 | A1 | 11/2010 | Satulovsky | |
| 2011/0093205 | A1 | 4/2011 | Bern | |
| 2012/0047098 | A1 | 2/2012 | Reem | |
| 2012/0245857 | A1 | 9/2012 | Lee et al. | |
| 2013/0080073 | A1 | 3/2013 | de Corral | |
| 2013/0144540 | A1 | 6/2013 | Bern et al. | |
| 2013/0226594 | A1 | 8/2013 | Fuchs et al. | |
| 2013/0262809 | A1 | 10/2013 | Wegener | |
| 2013/0275399 | A1 | 10/2013 | Amit et al. | |
| 2013/0289892 | A1 | 10/2013 | Satoh | |
| 2014/0045273 | A1* | 2/2014 | Cerda | G16C 20/20 422/83 |
| 2014/0164444 | A1 | 6/2014 | Bowen et al. | |
| 2015/0319268 | A1 | 11/2015 | Callard et al. | |
| 2015/0369782 | A1 | 12/2015 | Kageyama | |
| 2016/0077926 | A1 | 3/2016 | Mutalik et al. | |
| 2016/0180555 | A1 | 6/2016 | Matsuo | |
| 2016/0215028 | A1 | 7/2016 | Mutharia et al. | |
| 2016/0268112 | A1 | 9/2016 | Yip et al. | |
| 2018/0301326 | A1 | 10/2018 | Bern et al. | |
| 2020/0413066 | A1 | 12/2020 | Lavaud | |
| 2022/0076936 | A1 | 3/2022 | Bern | |
| 2022/0207778 | A1 | 6/2022 | Kletter | |
| 2022/0291229 | A1 | 9/2022 | Nichols et al. | |
| 2022/0301840 | A1 | 9/2022 | Kil et al. | |

FOREIGN PATENT DOCUMENTS

| | | | | |
|---|---|---|---|---|
| WO | WO2011/127544 | A1 | 10/2011 | |
| WO | WO2015/031820 | A1 | 3/2015 | |
| WO | WO-2015148941 | A1 * | 10/2015 | G06K 9/00543 |

OTHER PUBLICATIONS

"Deconvolution in mass spectrometry based proteomics", pp. 763-774, Wiley, Rapid Communications in Mass Spectrometry; Guang Xu (Year: 2017).*

Michael T. Marty "Bayesian Deconvolution of Mass and Ion Mobility Spectra: From Binary Interactions to Polydisperse Ensembles"; Pages A-G (Year: 2015).*

ZNova Decorivolutiori; retrieved from the internet (https://web.archive.org/web/20141106214830/http://www.enovatia.com:80/downloads/manuals/promass/Help/html/prom2cdq.htm); 1 page; on Oct. 6, 2023.

Kletter et al.; U.S. Appl. No. 18/460,028 entitled "Data Compression for multidimensional time series data," filed Sep. 1, 2023.

Klammer et al.; Peptide charge state determination for low-resolution tandem mass spectra; In2005 IEEE Computational Systems Bioinformatics Conference (CSB'05); pp. 175-185; Aug. 8, 2005.

Krokhin et al.; An improved model for prediction of retention times of tryptics peptides in ion pair reversed-phase HPLC: its application to protein peptide mapping by off-line HPLC-MALDI MS; Molecular and Cellular Proteomics; 3(9); pp. 908-919; Sep. 2004.

Lu et al.; Improved peak detection and deconvolution of native electrospray mass spectra from large protein complexes; Journal of the American Society for Mass Spectrometry; 26(12); pp. 2141-2151; Dec. 2015.

Marty et al.; Bayesian deconvolution of mass and ion mobility spectra: from binary interactions to polydisperse ensembles; Analytical Chemistry; 87(8); pp. 4370-4376; 7 pages; (Author Manuscript); Apr. 2015.

Marty; What can unidec do for you? Mar. 24, 2015I 28 pages; retrieved from the internet (http://unidec.chem.ox.ac.uk/UniDecTutorial.pdf) on Oct. 25, 2022.

Schreiber et al.; Using PeakView(TM) software with the XIC manager for screening and identification with high confidence based on high resolution and accurate mass LC-MS/MS; AB Sciex; Food & Environmental; (Pub. #2170811-03); 5 pgs.; Apr. 2, 2011.

Shi et al.; Feature-based image set compression; 2013 IEEE International Conference on Multimedia and Expo (ICME); IEEE; pp. 1-6; Jul. 15, 2013.

Shi et al.; Multi-model prediction for image set compression; 2013 Visual Communications and Image Processing (VCIP); IEEE; pp. 1-6; Nov. 17, 2013.

Thermo Fisher Scientific, Inc .; Thermo Xcaliber: Qualitative Analysis (User Guide); Revision B; 290 pgs .; Sep. 2010.

Valot et al.; MassChroQ: A versatile tool for mass spectrometry quantification; Proteomics; 11(17); 23 pgs.; Sep. 2011.

VanBRAMER; An Introduction to Mass Spectrometry; Wider University; 38 pgs.; @1997; (revised) Sep. 2, 1998.

Waters Corporation; Biopharmalynx: A new bioinformatics tool for automated LC/MS peptide mapping assignment; 6 pages retrived May 17, 2018 from the internet (http://www.waters.com/webassets/cms/library/docs/720002754en.pdf); Sep. 2008.

Waters Corporation; MassLynx 4.1 Getting started guide; 71500113203/RevisionA; 96 pages; retrieved May 17, 2018 from the internet

(56) References Cited

OTHER PUBLICATIONS (http://turroserver.chem.columbia.edu/group/instrument/HPLC/HPLC%20Getting%20Started.pdf) ; 2005.
Waters Corporation; QuanLynx User's Guide; Version 4.0; 125 pages; retrived May 17, 2018 from the internet ( http://www.waters.com/webassets/cms/support/docs/quanlynx_40.pdf); Feb. 15, 2002.
Wehofsky et al.; Isotopic deconvolution of matrix-assisted laser desorption/ionization mass spectra for substance-class specific analysis of complex samples; European Journal of Mass Spectrometry; 7(1); pp. 39-46; Feb. 1, 2001.
Xu et al.; Deconvolution in mass spectrometry based proteomics; Rapid Communications in Mass Spectrometry: 32(10); pp. 763-774; May 30, 2018.
Yang et al.; Detecting low level sequence variants in recombinant monoclonal antibodies; mAbs 2 (3); pp. 285-298; May/Jun. 2010.
Yang et al.; Hybrid mass spectrometry approaches in glycoprotein analysis and their usage in scoring biosimilarity; Nature Communications; 7(1); pp. 1-10; Nov. 8, 2016.
Ziv et al.; A universal algorithm for sequential data compression; IEEE Trans. on Information Theory; IT-23(3); pp. 337-343; May 1977.
Ziv et al.; Compression of individual sequences via variable-rate coding; IEEE Trans. on Information Theory; IT-24(5); pp. 530-536; Sep. 1978.
Bern et al.; U.S. Appl. No. 18/298,327 entitled "Interactive analysis of mass spectrometry data including peak selection and dynamic labeling," filed Apr. 10, 2023.

* cited by examiner

METHODS AND APPARATUSES FOR DECONVOLUTION OF MASS SPECTROMETRY DATA

CROSS REFERENCE TO RELATED APPLICATIONS

This application is a continuation of U.S. patent application Ser. No. 16/562,329, titled "METHODS AND APPARATUSES FOR DECONVOLUTION OF MASS SPECTROMETRY DATA," filed Sep. 5, 2019, now U.S. Pat. No. 11,640,901 which claims priority to U.S. Provisional Patent Application No. 62/727,411, titled "METHODS AND APPARATUSES FOR DECONVOLUTION OF MASS SPECTROMETRY DATA," filed on Sep. 5, 2018, each of which is incorporated herein by reference in its entirety.

This application may be related to U.S. patent application Ser. No. 15/881,698, filed Jan. 26, 2018, and entitled "METHODS AND APPARATUSES FOR DETERMINING THE INTACT MASS OF LARGE MOLECULES FROM MASS SPECTROGRAPHIC DATA," which is incorporated herein by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The invention is in the field of mass spectrometry and more specifically in the field of the analysis and interpretation of data produced by a mass spectrometer.

BACKGROUND

Mass spectrometry is an analytical tool that can be used to determine the molecular weights of chemical compounds by generating ions from the chemical compounds, and separating these ions according to their mass-to-charge ratio (m/z). The resulting data are often presented as a spectrum, a two-dimensional plot with m/z ratio on the x-axis and abundance of ions on the y-axis. Thus, this spectrum shows a distribution of m/z values in the population of ions being analyzed. Smaller chemical compounds typically ionize to have a single charge, such as a positive charge of one (1+). In these cases, the x-axis representing the m/z ratio of the spectrum will correspond to mass distribution of the various ionized species in the sample. If the sample is a pure compound or contains only a few compounds, mass spectrometry can reveal the identity of the compound(s) in the sample.

A complex sample can contain a mixture of chemical compounds. For example, proteins can be part of a complex mixture of multiple proteins and molecules that co-exist in a biological medium. Mass spectrometry performed on such complex samples can be difficult to interpret since the sample may contain too many species to accurately identify any particular chemical species. Thus, a complex sample is typically resolved to some extent in order to at least partially separate out a chemical compound of interest prior to ionization via a mass spectrometer system. Even after sample separation, it can be difficult to characterize a chemical compound if the chemical compound is a large compound. In particular, large molecules, such as proteins, may have multiple regions that may become ionized during ionization. Furthermore, fragments of a large molecule can also become multiply charged. The result is an m/z spectrum having peaks representing species having different combinations of masses and charge states. Those ions having the same mass but with different charge states will be represented by a number of peaks. Likewise, those ions having the same charge states but different masses will be represented by a number of peaks. Thus, rather than an m/z spectrum representing a simple mass distribution of singly charged species, an m/z spectrum of a multiply-charged species will have a convoluted peak distribution representing species having any of a number of different masses and charge states.

Deconvolution methods are computational analysis techniques that involve inferring ion species masses or charges based on m/z spectrum data. The inferred charges can be used to transform a m/z spectrum to a neutral mass spectrum by multiplying m/z values by the inferred values of z (charge) and subtracting the masses of the charge carriers (typically protons) to determine neutral mass. The charges of the ions species may be deduced by relationships among peaks in the m/z spectrum, relying on the presumption that an ion at a given charge state (e.g., 50+) is also likely to be observed within different charge states charges (e.g., 48+, 49+, 51+ and 52+). Two types of artifacts are commonly observed: "harmonic" artifacts in which a particular charge state (e.g., 50+) might be mistaken for a fractional charge state (e.g., 25+); and "off-by-one" artifacts in which a charge state (e.g., 50+) is mistaken by one charge (e.g., 49+ or 51+). Such artifacts may cause a deconvolution algorithm to report false masses on a neutral mass spectrum. For example, the neutral mass spectrum may indicate peaks at one-half or one-third of the correct mass, or numerous closely-spaced peaks near the correct mass. Attempts to reduce the presence of false peaks may reduce noise, however, such attempts may also incorrectly suppress "real" peaks. It is desirable to have better methods for deconvoluting complex mass spectral data from samples comprising large molecules.

Therefore, it would be beneficial to provide methods and apparatuses that address the problems described above.

SUMMARY OF THE DISCLOSURE

The present invention relates to methods and apparatuses (including devices, systems, and software, hardware and/or firmware) for analyzing mass spectrometry data, including data related to large molecules, such as proteins and nucleic acids. The methods and apparatuses may be used to deconvolute mass spectrometry data, and to estimate the masses and abundance of neutral species within a sample (also referred to as an "analyte"). In some cases, the methods and apparatuses are used to provide a neutral mass spectrum, which represents various neutral species as an arrangement of peaks ordered in accordance with their corresponding masses.

According to some embodiments, the deconvolution methods may be used to estimate a charge state (also referred to as "charge") of one or more species within the sample. The estimation can be deduced from the mass spectrometry data (e.g., mass-to-charge (m/z) spectrum data) and a mass delta value, which corresponds to a mass of a constituent of the at least one of the one or more ionic species. The mass delta value may be received from a user and/or from a database of predetermined mass delta value(s). In some cases, the deconvolution calculation relies on multiple mass delta value(s). The mass delta value(s) can be matched with spacings between peaks of the m/z spectrum data, which can then be used to estimate the charge state(s) of the one or more ionic species. The charge state information can, in turn, be used to deduce the mass of the one or more ionic species. Once the mass of the one or more ionic species is identified, the masses of neutral species within the sample may be resolved.

The deconvolution methods described herein can be used alone or in conjunction with other deconvolution calculations. For example, the mass delta value(s) may be used to provide an initial estimate of the charge state(s) of the one or more ionic species, which then biases another deconvolution calculation toward a more accurate result. In some instances, another deconvolution calculation is used to provide an initial estimate of charge state(s), which is then improved upon using the mass delta value(s) deconvolution. Any of these methods may also include iterative calculations to increase the accuracy of the results.

For example, described herein are methods, including computer-implemented methods for providing neutral mass information associated with a molecule from mass spectrometry data. Any of these methods may include: receiving, in a processor, a mass-to-charge ratio data set for the molecule, wherein the mass-to-charge ratio data set includes a plurality of mass-to-charge peaks corresponding to a plurality of ions or fragments of the molecule, wherein at least some of the plurality of mass-to-charge peaks are separated by one or more spacing values; accessing, by the processor, a listing including a plurality of mass delta values, wherein each mass delta values corresponds to a mass of a constituent of the molecule; comparing, by the processor, the mass-to-charge ratio data to the plurality of mass delta values to determine one or more estimated charges of the plurality of ions or fragments of the molecule, wherein the comparing includes determining an integer, k, corresponding to at least one of the mass delta values divided by the one or more spacing values, wherein at least one of the one or more estimated charges is equal to the integer k; and generating a neutral mass spectrum based at least in part on the estimated one or more charges.

This method may be used in conjunction with other techniques that infer charge either from isotope peak spacing or from ratio relationships among peaks with various charge states, or may be used independently of these techniques. For example, the methods described herein are methods in which the one or more estimated charges comprises a first estimated charge, wherein the method further includes comparing a second estimated charge of the plurality of ions or fragments of the molecule with the first estimated charge, wherein the second estimated charge is estimated based on a deconvolution calculation that does not rely on the mass delta value; and further wherein generating the neutral mass spectrum comprises generating the neural mass spectrum based on the one or more estimate charges and the second estimated charge. In some variations, the second estimated charge may be estimated based on determining integer ratios among mass-to-charge peaks corresponding to differently charged ions or fragments of the same mass. In some variations, the second estimated charge may be estimated based on a mass difference of the plurality of ions or fragments of the molecule due to mass differences of atomic isotopes.

Any of these methods may include generating the listing of the plurality of mass delta values based on input from a user. For example, the user may select one or more mass delta candidates (e.g., sodium, glucose, phosphorylation, etc.), or a group of mass deltas (e.g., glycosylation mass deltas, etc.). In some variations the user may enter the actual mass delta values; alternatively or additionally, the user may enter a name or index for the candidate and the processor may look up (e.g. from a look-up table) the associated mass delta values. For example, the listing of the plurality of mass delta values may include a mass delta for one or more of: a sodium adduct, phosphorylation, a 6-carbon sugar, a glucose, and a trisaccharide.

Comparing the mass-to-charge ratio data to the plurality of mass delta values to determine the one or more estimated charges may comprise determining a plurality of estimated charges, including k and k+1 (e.g., k−2, k−1, k, k+1, k+2, etc.). Any appropriate number of chares may be estimated.

In any of these methods, comparing the mass-to-charge ratio data to the plurality of mass delta values to determine the one or more estimated charges may comprise determining a plurality of estimated charges for each of the plurality of ions or fragments of the molecule.

Generating the neutral mass spectrum may comprise iteratively estimating the charges for the plurality of ions or fragments of the molecule by assigning an initial probability to each of a plurality of charge states each of the plurality of ions or fragments, modifying the initial probabilities of the charge states based on the mass delta value and calculating an estimated mass for each of the plurality of ions or fragments of the molecule based on the one or more estimated charges. For example, assigning the initial probability may comprise assigning the initial probability to each of the plurality of charge states to have equal probability. In some variations, providing the estimated charge comprises: providing an initial probability of a charge for each of the plurality of ions or fragments of the molecule over a range of charges; and iteratively: modifying the initial probability of the charges by changing the probabilities using a deconvolution calculation without relying on the mass delta value; calculating an estimated mass of at least some of the ions or fragments of the molecule based on the modified initial charge probabilities; and adjusting the estimated charge based on the mass delta values.

Also described herein are non-transitory computer-readable medium with instructions stored thereon, that when executed by a processor, cause the processor to perform any of the methods described herein including causing the processor to: receive a mass-to-charge ratio data set for the molecule, wherein the mass-to-charge ratio data set includes a plurality of mass-to-charge peaks corresponding to a plurality of ions of the molecule or molecule fragments, wherein at least some of the plurality of mass-to-charge peaks are separated by one or more spacing values; access a listing including a plurality of mass delta values, wherein each mass delta values corresponds to a mass of a constituent of the molecule; compare the mass-to-charge ratio data to the plurality of mass delta values to determine one or more estimated charges of the plurality of ions, wherein the comparing includes determining an integer, k, corresponding to at least one of the mass delta values divided by the one or more spacing values, wherein at least one of the one or more estimated charges is equal to the integer k; and generate a neutral mass spectrum based at least in part on the estimated one or more charges.

Also described herein are systems for performing any of the methods described herein. For example, a system for providing neutral mass information associated with a molecule from mass spectrometry data may include: a first memory for storing plurality of mass delta values; one or more processors; and memory coupled to the one or more processors, the memory configured to store computer-program instructions, that, when executed by the one or more processors, perform a computer-implemented method comprising: receiving, in a processor, a mass-to-charge ratio data set for the molecule, wherein the mass-to-charge ratio data set includes a plurality of mass-to-charge peaks corresponding to a plurality of ions or fragments of the molecule, wherein at least some of the plurality of mass-to-charge peaks are separated by one or more spacing values; accessing, by the processor, a listing including a plurality of mass delta values, wherein each mass delta values corresponds to a mass of a constituent of the molecule; comparing, by the processor, the mass-to-charge ratio data to the plurality of mass delta values to determine one or more estimated charges of the plurality of ions or fragments of the molecule, wherein the comparing includes determining an integer, k, corresponding to at least one of the mass delta values divided by the one or more spacing values, wherein at least one of the one or more estimated charges is equal to the integer k; and generating a neutral mass spectrum based at least in part on the estimated one or more charges.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

In FIG. 8A, a data file (e.g., native-MS infusion or LC-MS based data file) for deconvolution may be dropped into a user interface for processing.

as shown in FIG. 8B, the loaded files (e.g., see FIG. 8A) may be processed or deconvoluted.

DETAILED DESCRIPTION

Described herein are methods and apparatuses (including systems, software and devices) to analyzing mass spectrometry data. In particular, described herein are methods and apparatuses for providing neutral mass information (e.g., a neutral mass spectrum) associated with a molecule from mass spectrometry data. Mass spectrometry data includes information as to various molecular species within an analyte separated out in terms of their mass-to-charge ratio (m/z). The methods described herein are well adapted for deconvoluting mass spectrometry data of multiply charged molecules. Macromolecules, such as proteins, peptides, nucleic acids, carbohydrates, lipids, ligands, or combination thereof, can become multiply charged during the ionization process of mass spectrometry. Ion fragments of these macromolecules can also become multiply charged. Thus, chemical species having the same mass may be present in multiple charge states. As a result, the m/z spectra of large molecules can be a complex sequence of peaks representing different chemical species in multiple charge states.

The techniques described herein can involve using one or a list of mass delta values as an input to identify charge states and therefore masses from mass spectrometry data. The mass delta values can correspond to masses of known or possible constituents of one of the molecular species within the mass spectrometry data set. The constituent may be an atomic or molecular species. For example, the constituent can include one or more adducts, ligands, metals or functional groups. Examples of constituents may include a sodium adduct (having a mass of about 22 Daltons (Da)), a phosphorylation moiety (having a mass of about 80 Da), glucose (having a mass of about 162 Da), a trisaccharide (e.g., HexNAc-Hex-NeuAc having a mass of about 656 Da), and/or a drug that binds to a macromolecule, such an antibody-drug conjugate (ADC). The molecule of interest may be present in multiple forms, each having different amounts of the constituent. For example, a protein may be present in forms having zero, one, two, three, four, or more of an identified constituent, with each form having a different mass. In some embodiments, multiple mass delta values (e.g., 2, 3, 4, 5, or 6) may be used to analyze the mass spectrometry data.

In general, a mass over charge (m/z) spectrum can be analyzed to identify spacings between peaks that may correlate with the one or more mass delta values. For instance, a computer processor can include instructions that cause the processor (including one or more processors) to analyze the m/z spectrum to recognize one or more patterns of peaks having a spacing corresponding to mass delta values divided by an integer (k). If such patterns of peaks and spacings are found, the program can assign k as a likely charge for those m/z peaks.

Figure 1:
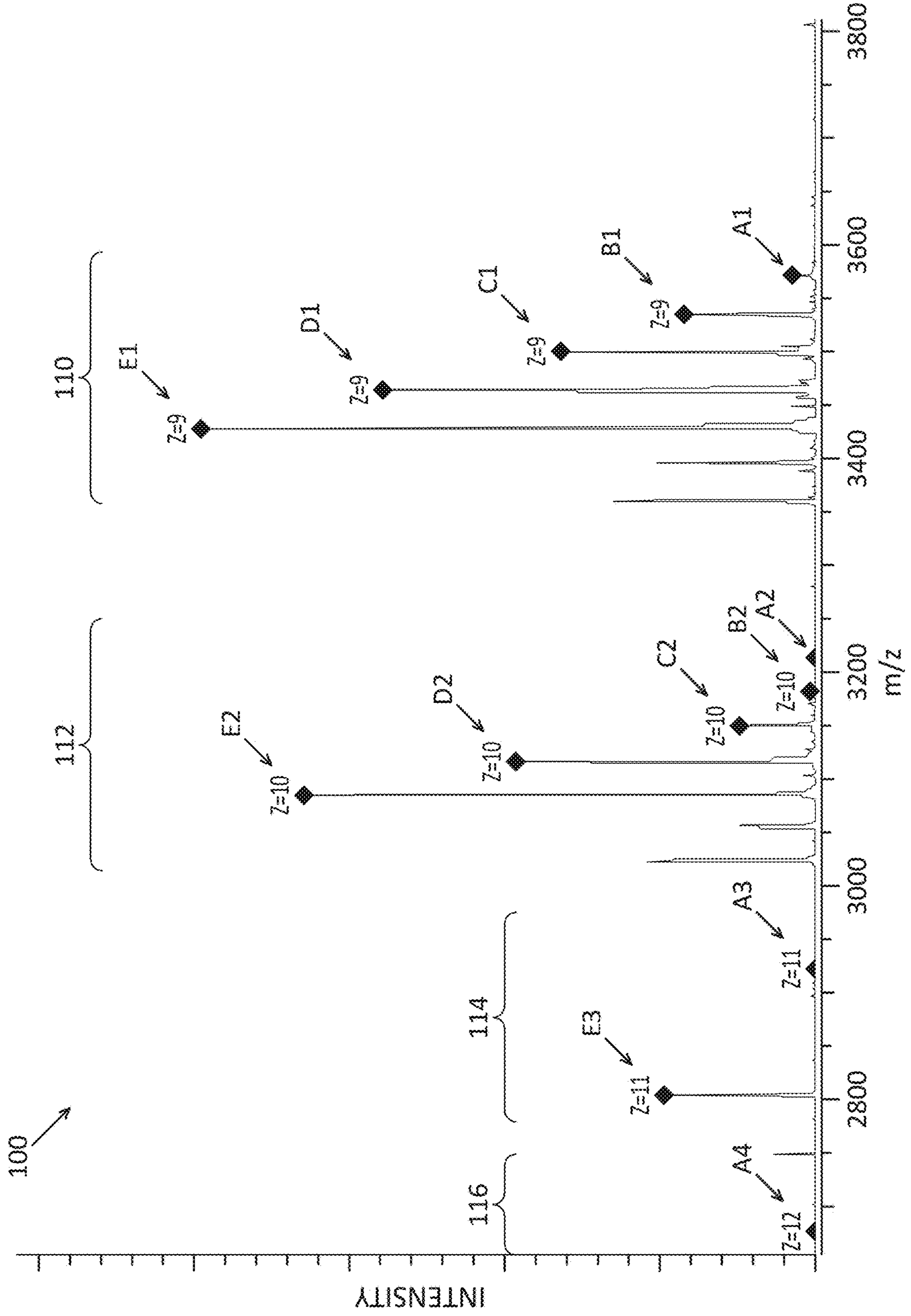
FIG. 1 shows an m/z mass spectrum of a protein sample, with estimated charge information from a deconvolution calculation.

By way of example, FIG. 1 shows an m/z spectrum 100 of a protein sample that can be deconvoluted to identify a likely neutral mass spectrum using the methods described herein. The m/z spectrum 100 can be observed to include a first cluster of peaks 110, a second cluster of peaks 112, a third cluster of peaks 114, and a fourth cluster of peaks 116. In this example, the peaks within each of the clusters may represent multiple forms of a molecular species (e.g., ions or fragments of a particular molecule), and each cluster can represent molecular species having the same charge state. This distribution of differently charged ions may be due to the ionization process, which is a random process by which a large molecule can become charged by varying degrees. For example, peaks A1, B1, C1, D1 and E1 may represent molecular ions having different masses (and varying amounts of a constituent) in the same charge state. In some m/z spectra, the clusters of peaks corresponding to molecular ions in the same charge state do not overlap. In some m/z spectra, the clusters of peaks corresponding to molecular ions in the same charge state overlap. The deconvolution methods described herein can be used to resolve mass and/or charge of molecular species having a single charge state (e.g., one cluster of peaks) and/or having multiple charge states (e.g., multiple clusters of peaks).

The methods described herein can be configured to recognize patterns within an m/z spectrum data using one or more putative mass delta values as input. In the protein sample of spectrum 100, at least some of the proteins are known to include a constituent, which in this case may be a ligand having a mass delta value of about 322 Da. Thus, a mass delta value of 322 can be used as an input. Spectrum 100 shows that peak A1 has an m/z of 3570, peak B1 has an m/z of 3536, peak C1 has an m/z of 3500, peak D1 has an m/z of 3465, and peak E1 has an m/z of 3428. Thus, spacings between the peaks A1, B1, C1, D1 and E1 can average out to be about 36. When the deconvolution program(s) recognizes m/z peaks with a pattern of spacings corresponding to the mass delta value (322) divided by an integer k, the program(s) can increase the probability that k is a charge for those m/z peaks. For example, based on a mass delta value of 322, the program(s) can increase the probability that each of the charges of the ions corresponding to peaks A1, B1, C1, D1 and E1 is about 9, because 322 divided by 9 is 35.8 (the approximate average spacing between peaks A1, B1, C1, D1 and E1). Similar analysis can also be performed on peak clusters 112, 114 and 116 to estimate charge. For example, spacings between peaks A2, B2, C2, D2 and E2 can average out to be about 32.5. Based on a mass delta value of 322, the program(s) can increase the probability that the charges of each of the ions corresponding to peaks A2, B2, C2, D2 and E2 is about 10, because 322 divided by 10 is 32.2 (the approximate average spacing between peaks A2, B2, C2, D2 and E2). Similar analyses can be used to estimate a charge of 11 for each of the ions represented by peaks A3 and E3, and to estimate a charge of 12 for the ion represented by peak A4. In this way, charges (z) of various ionic species can be deconvoluted from the m/z spectrum.

Deconvoluted data can be used to identify corresponding peaks among the clusters of peaks. For example, peaks A1, A2, A3 and A4 can be inferred to correspond to ions having the same mass with charges 9+, 10+, 11+ and 12+, respectively. Likewise, peaks B1 and B2 can be inferred to correspond to ions having the same mass with charges 9+ and 10+, respectively; peaks C1 and C2 can be inferred to correspond to ions having the same mass with charges 9+ and 10+, respectively; peaks D1 and D2 can be inferred to correspond to ions having the same mass with charges 9+ and 10+, respectively; and peaks E1, E2 and E3 can be inferred to correspond to ions having the same mass with charges 9+, 10+ and 11+, respectively.

Deconvoluted data can be used to identify corresponding peaks within the clusters of peaks. For example, peaks A1, A2, A3 and A4 can be inferred to represent forms of the target protein having different amounts of the ligand species. In particular, peak A1 can be inferred to correspond to a form of the protein bonded with four of the ligand species, peak B1 can be inferred to correspond to a form of the protein bonded with three of the ligand species, peak C1 can be inferred to correspond to a form of the protein bonded with two of the ligand species, peak D1 can be inferred to correspond to a form of the protein bonded with one of the ligand species, and peak E1 can be inferred to correspond to a form of the protein without the ligand species. Likewise, peaks A2, B2, C2, D2 and E2 can be inferred to correspond to forms of the protein bonded with four, three, two, one and zero ligands, respectively; peaks A3 and E3 can be inferred to correspond to forms of the protein bonded with four and zero ligand species, respectively; and peak A4 can be inferred to correspond to a form of the protein bonded with four ligand species.

Figure 2:
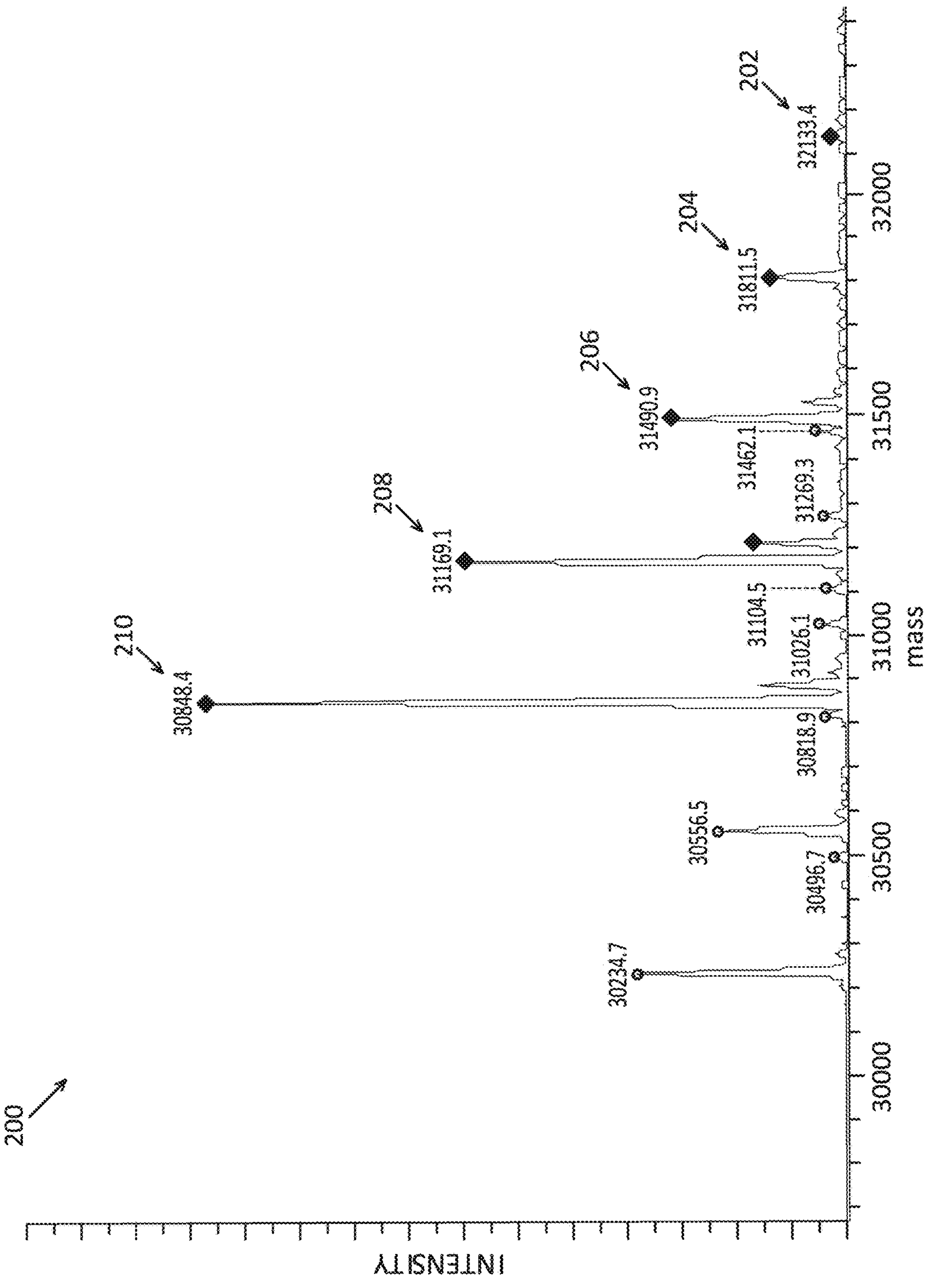
FIG. 2 shows a neutral mass spectrum of the same protein sample of FIG. 1 calculated using the estimated charge information.

From the estimated charge states, the m/z spectrum may be used to estimate the mass of one or more species within the sample. For example, that peak A1 has an m/z of 3570 and can be calculated to correspond to a form of the protein having a mass at of about 32,130 Da (m/z peak times estimated charge, z, e.g., 9). The masses of different forms of the protein (e.g., corresponding to B1, C1, D1, etc.) can similarly be calculated. Such mass data can be used to produce a neutral mass spectrum, which includes a series of peaks representing various neutrally charged species ordered according to their mass. The peak intensities of the peaks within a neutral mass spectrum may be used to quantify relative amounts of chemical species within the sample. By way of example, FIG. 2 shows a neutral mass spectrum 200, which includes peaks 202, 204, 206, 208 and 210 representing various neutral forms of the protein of interest. In particular, peak 202 represents the protein of interest bonded to four ligand species, peak 204 represents the protein of interest bonded to three ligand species, peak 206 represents the protein of interest bonded to two ligand species, peak 208 represents the protein of interest bonded to one ligand species, and peak 210 represents the protein of interest without the ligand species. The intensity of the peaks in the neutral mass spectrum can indicate the relative abundance of each of the species. For example, the neutral mass spectrum 200 indicates that the abundance of the form of protein without the ligand species is likely higher than that of each of the forms of protein bonded with ligand species since the intensity of peak 210 is greater than each of peaks 202, 204, 206 and 208. Furthermore, the relative amounts of the forms of the protein of interest having zero, one, two, three, and four ligand species can be estimated by calculating the intensity ratios of peaks 202, 204, 206, 208 and 210. Thus, the deconvoluted data can be used to estimate the relative quantity of species within a mass spectrometry sample.

In some cases, the presence or non-presence of the constituent as part of an ionic species can affect the charge state of the ionic species. In these cases, the deconvolution can take into consideration the change in charge along with the change in mass when the constituent is present or not present. For example, it may be determined that the presence of the constituent may increase or decrease the charge state of the ionic species by about one. In this case, the deconvolution program(s) can be configured to recognize spacing patterns within clusters of peaks at different locations along an m/z spectrum (e.g., above and/or below an expected location of the clusters).

According to some embodiments, the deconvolution relies on using multiple mass delta values. In some cases, using multiple mass delta values can provide a more accurate result than using one mass delta value. The multiple mass delta values can correspond to different constituents that may be present in different forms of a molecular compound of interest in varying amounts. For example, different forms of a molecular compound may have a sodium atom (having a mass of about 22 Da), a glucose constituent (having a mass of about 162), and a HexNAc-Hex-NeuAc trisaccharide (having a mass of about 656 Da) in varying amounts (e.g., zero, one, two, three, four, etc.). The deconvolution program(s) can be configured to analyze an m/z spectrum for peak patterns corresponding to the multiple forms of a molecular compound, and to distinguish m/z peaks based on the mass delta value inputs. For example, if three mass delta values of 100, 110 and 120 are provided, the program(s) may infer that peaks with spacings of about 20 in the m/z spectrum correspond to the mass delta value of 100 and/or 120, because 100 and 120 are each divisible by 20. That is, the mass delta value of 110 can be likely eliminated as contributing to peaks having the spacings of about 20 since 110 is not divisible by 20.

Figure 3:
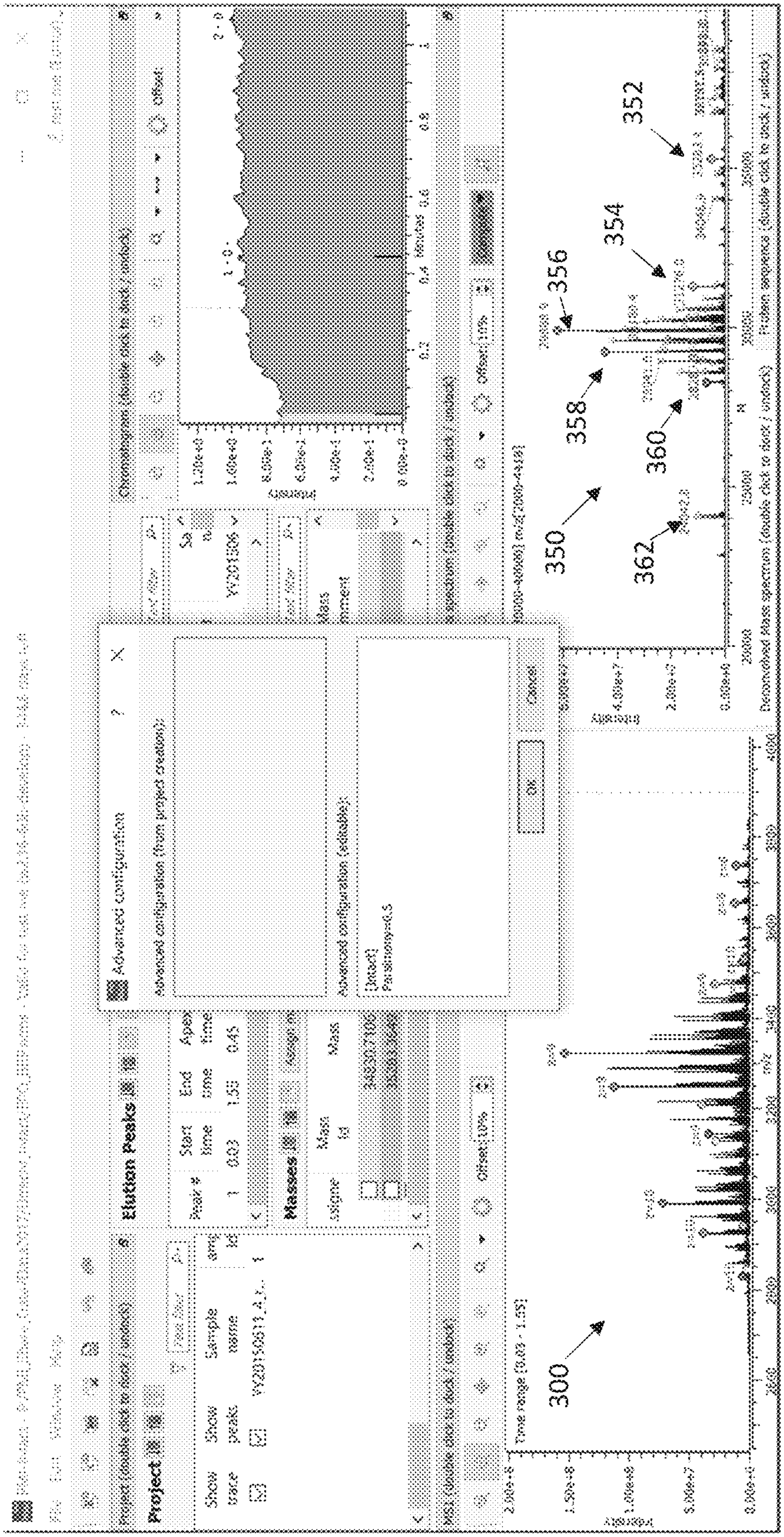
FIG. 3 shows m/z and neutral mass spectra of a protein sample with estimated charge and mass information calculated using a peak spacing ratio deconvolution calculation, according to some embodiments.
Figure 4:
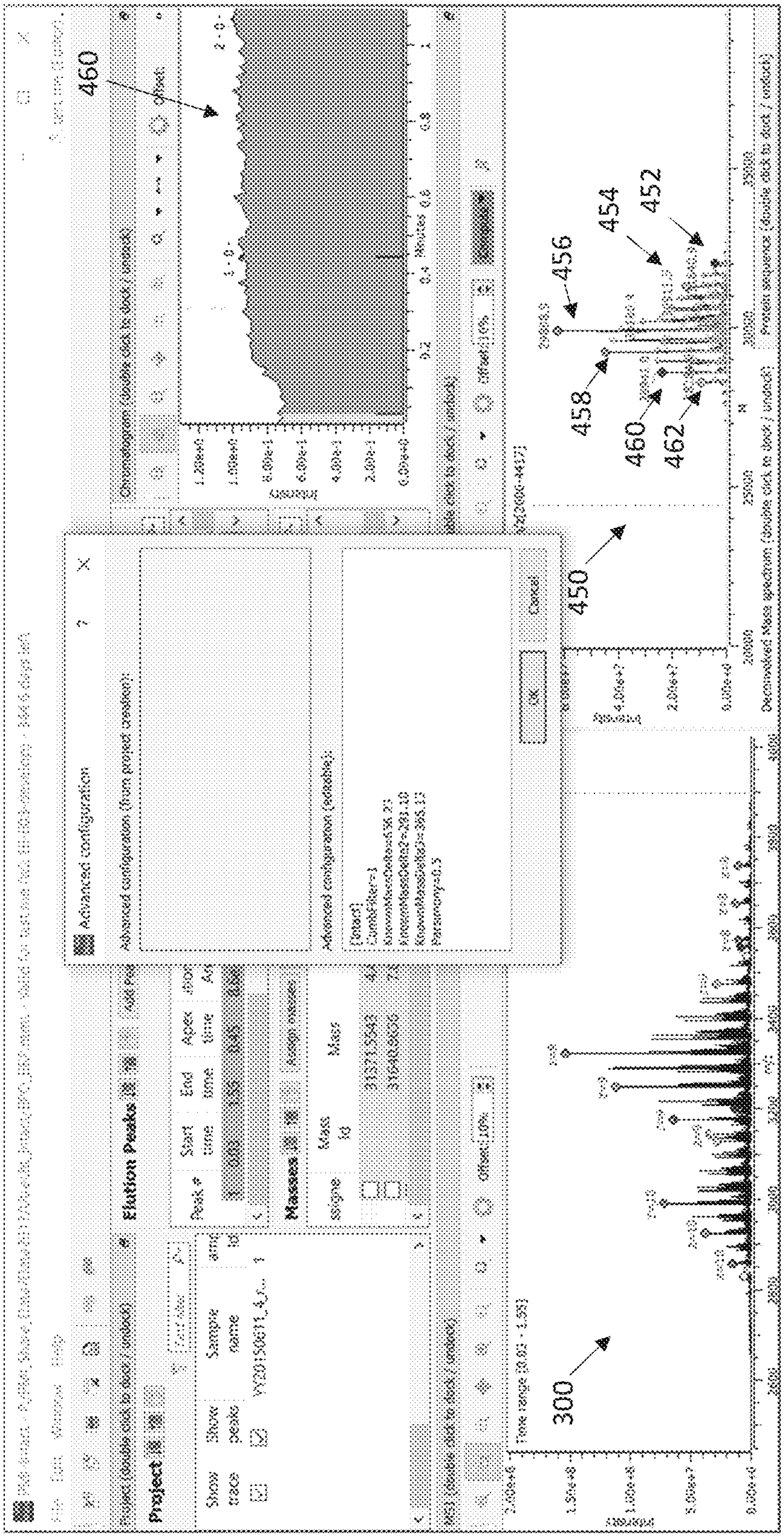
FIG. 4 shows m/z and neutral mass spectra of a protein sample with estimated charge and mass information calculated using a mass delta deconvolution calculation, according to some embodiments.

The methods described herein can be used to resolve charge states and/or mass more accurately than other deconvolution methods. For example, FIGS. 3 and 4 show deconvolution results of a protein sample using a peak spacing ratio deconvolution method and using the inventive mass delta value deconvolution method described herein, respectively. The raw m/z spectrum data for FIGS. 3 and 4 are from the same protein sample. FIG. 3 shows an m/z spectrum 300 and neutral mass spectrum 350 with charge states and masses resolved for the protein of interest using a peak spacing ratio deconvolution method. This peak spacing ratio deconvolution method relies on the sample having the protein of interest in multiple charge states. That is, the estimated charge is estimated based on determining integer ratios among mass-to-charge peaks corresponding to differently charged ions of the same mass. This method involves identifying peaks within the m/z spectrum 300 and calculating likely charge states (i.e., 8+, 9+ and 10+) based on a ratio of spacing and charge. In particular, the spacings between peaks that are divisible by integers are identified and assigned the charges of those integers. For example, peaks having spacings that are approximately divisible by 8 are assigned to have a charge of 8+, peaks having spacings that are approximately divisible by 9 are assigned to have a charge of 9+, and peaks having spacings that are approximately divisible by 10 are assigned to have a charge of 10+, as shown in m/z spectrum 300. The neutral mass spectrum 350 is provided based on these estimated charges. The neutral mass spectrum in FIG. 3 includes a number of high end 352 and lower-mass 362 peaks.

FIG. 4 shows the same m/z spectrum 300 (as in FIG. 3) and neutral mass spectrum 450 that was generated using the method and apparatus described herein using a plurality of putative mass delta values. The list of mass delta values is shown in the "advanced configuration box" overlaid onto the display. In this example, the use of these three mass delta values (which may be manually entered by a user or automatically selected, or a combination of both) were used as described above to estimate various charge states corresponding to some of the peaks in the m/z spectrum, and this information used to determine the neutral mass spectrum. Thus, in FIG. 4 the same m/z spectrum is shown, but the putative charge states for the various peaks is slightly different, as shown by the labels (charge labels) on the various peaks. In FIG. 4 the use of mass deltas as part of the deconvolution method relies on three mass delta values: 291.10, 365.13 and 656.23, which may correspond to masses of constituents known to exist in different forms of the protein of interest (e.g., various phosphorylation states, glycosylation states, etc.). The m/z spectrum may be analyzed to identify m/z peaks with a pattern of spacings corresponding to a mass delta value of about 291.10, 365.13 and/or 656.23 divided by an integer k (e.g., putative charge states). Once such m/z peaks are identified, the processor(s) can increase the probability that k is a charge for those m/z peaks. In this way, various peaks within m/z spectrum are assigned corresponding estimated charges as shown in m/z spectrum 300. The neutral mass spectrum 450 is provided based on these estimated charges.

Differences between the spectra of FIGS. 3 and 4 indicate that the use of mass delta values as shown in FIG. 4 likely provides more accurate results than those using a simple peak spacing ratio alone (shown in FIG. 3). For example, neutral mass spectrum 450 in FIG. 4 indicates several peaks 452, 454, 458, 460 and 462 around base peak 456, which is consistent with the (known) several neutral forms of the protein of interest, with varying amounts of the mass delta value constituents. In contrast, neutral mass spectrum 350 has peaks 352, 354, 358 and 360 corresponding to various neutral forms of the protein of interest that are more widely spread from the base peak 356, which suggest that the peaks outside of masses of 27,000-33,000 are likely to be false (e.g., the high mass 352 and low mass 362 peaks).

It should be noted that, unlike some deconvolution methods, the mass delta value methods described herein do not necessarily rely on a molecule of interest to have a multiply charged ionic species. That is, the molecule of interest may be present in different forms (different masses having different numbers of constituents). This may be useful for characterizing molecules that likely ionize to singly charged species, or that have multiply charged species in low numbers and that produce very small m/z signals.

Figure 5:
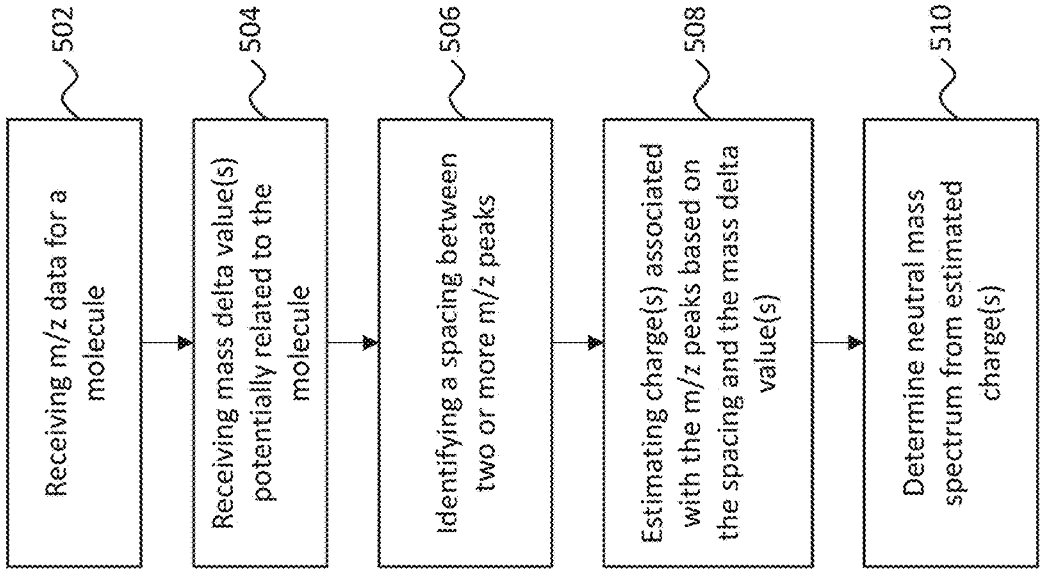
FIG. 5 shows a flowchart indicating one example of a deconvolution process.

FIG. 5 shows one example of a method (shown by flowchart 500) for determining a neutral mass spectrum. At 502, mass spectrometry data related to a molecule of interest, including m/z data, is received by the processor (e.g., a computer processor including memory storing instructions to perform the mass-delta method described herein). The mass spectrometry data can be collected using any type of mass spectrometry ionization techniques, such as electrospray ionization (ESI) and/or matrix-assisted laser desorption/ionization (MALDI). In some embodiments, the mass spectroscopy techniques are conducive to producing at least some ions of the molecule in an intact (substantially unfragmented) state. For example, some techniques, such as some electrospray ionization techniques, can be used to overcome a propensity of macromolecules to fragment when ionized and may also produce multiply charged ions.

At 504, a list of mass delta values that may be related to the molecule is received. The list of mass delta values may be stored in a datastore (e.g., a memory) accessible by the processor. As mentioned, the mass delta value(s) correspond to mass(es) of constituent(s) of the molecule of interest, which may be estimates (e.g., guesses). For example, the constituent(s) may be atomic and/or molecular moieties of different forms of the molecule of interest. In some embodiments, the mass delta value(s) is/are arbitrary value(s) or randomly provided value(s), which will converge after a number of iterative calculations. In some cases, the mass delta values are received from a user via an input device (e.g., keyboard, touchscreen, mouse, etc.) and may be manually entered, or selected from a provided database/listing. In some cases, the mass delta value(s) are stored as predetermined value(s) (e.g., not provided by a user). For example, the mass delta value(s) may correspond to the mass(es) of one or more typical moieties, such as glucose, glycol, phosphate and/or nitrate containing moieties.

At 506, spacing(s) between two or more peaks is identified and quantified in terms of m/z from the m/z spectrum. For example, a spacing between a first peak at 3000 m/z and a second peak at 3130 m/z would be 130 m/z. Multiple spacings between multiple peaks may be identified and quantified. The spacing values can be associated with the corresponding peaks in a database in order to subsequently assign estimated charge values to the correct peaks.

At 508, the mass delta values may be used to identify one or more charges corresponding to the m/z peaks based on the spacing(s) and the mass delta value(s). This can be accomplished by identifying those spacing(s) that correspond to a mass delta value divided by an integer k, where k is the estimated charge of the peaks associated with the spacing(s). For instance, for a mass delta value of 26, those peaks associated with spacing values of 130 can be assigned an estimated charge of about 5 (because 130 divided by 26 is 5). The estimated charges can then be used to determine the masses of the ions associated with the peaks. For example, the first peak at 3000 m/z can be estimated to correspond to an ion having a mass of about 15,000 Da (3000 times 5), and the second peak at peak at 3130 m/z can be estimated to correspond to an ion having a mass of about 15,650 Da (3130 times 5). The estimated charges and masses can be at least partially based on one or more data analysis techniques, such as Fourier transform and/or statistical techniques (e.g., regression analysis).

Neutral mass information related to the received mass spectrometry data may be provided based on the mass delta analysis. In particular, the neutral mass spectrum may be determined 510 and presented to the user. In general, the results of the mass delta analysis (deconvolution analysis) can be provided in any form. For example, the estimated charge and/or estimated mass of species within the sample can be provided to a user on a computer display or printed out on paper. In some cases, the information is used to provide labels (e.g., charge labels associated with peaks in the m/z spectrum). In some cases, the information is used to create a neutral mass spectrum, which may include estimated mass labels associated with peaks representing masses of neutral species within the sample. Further, as shown in FIG. 4, the charge states identified may be marked on the m/z spectrum, which may allow the user to compare the two spectra (m/z and neutral mass).

The methods described herein may iteratively calculate to improve the accuracy of the results. For instance, the methods described herein may iteratively compute neutral masses and the charges that would transform the neutral masses to an m/z spectrum close to the observed m/z spectrum. In some cases, the deconvolution methods and apparatuses described herein can be used in combination with methods and apparatuses described in U.S. patent application Ser. No. 15/881,698, filed Jan. 26, 2018, which is incorporated herein by reference in its entirety.

Figure 6:
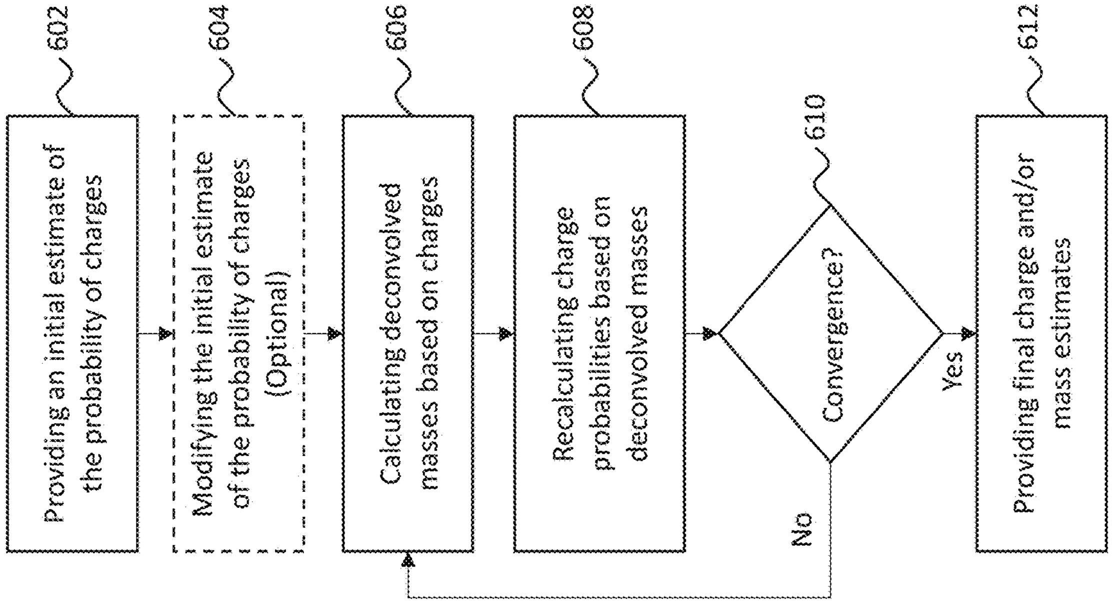
FIG. 6 shows a flowchart indicating an example of an iterative deconvolution process.

FIG. 6 shows an example of a method for determining neutral mass information from mass spectrometry data. In FIG. 6 the flowchart illustrates one example of an iterative process for deconvolving mass spectrometry data to determine neutral mass (e.g., a neutral mass spectrum). At 602, an initial estimate of the probability of each charge in a range of charges (e.g., a range of changes from, e.g., 0-100) of one or more ions from the m/z spectrometry data is provided. For example, an initial estimate of the probability for each charge may involve assuming that initial charge states for all have equal probability or a pre-biased probability. In some cases, the initial estimate of charge probability may be based on a deconvolution calculation. At 604, the initial estimate of charge is optionally modified. The modification can be based on information from the m/z spectrum, such as information regarding m/z peak spacings and/or heights, and/or from additional information, such as mass delta values, as described above. The modification can include changing the probability assigned to each of the charge states (e.g., to non-equal probabilities). The modification can effectively bias the probability of the occurrence of certain charge states and therefore masses. At 606, deconvoluted masses (e.g., by way of a neutral mass spectrum) may be calculated based on the estimated charges and the probability of each charge. At 608, the probability of the charges of the one or more ions may be recalculated based on the deconvoluted masses. At 610, a determination may be made as to whether the calculated masses and/or charges sufficiently converge with the observed m/z spectrum data. If sufficient convergence is not achieved, the deconvoluted masses are calculated again (606), and the probabilities of each of the charges may be recalculated based on the deconvoluted masses (608). If sufficient convergence is achieved 610, at a final charge and/or mass estimates may be provided 612, such as by providing a final neutral mass spectrum.

Any of the calculations in 602, 604, 606 and/or 608 can involve any combination of deconvolution techniques. For instance, in some cases, the initial estimate of charges is modified (604) based on a peak spacing ratio deconvolution calculation, which involve identifying possible spacings between m/z peaks of the intact molecule of interest at different charges (e.g., FIG. 3). For example, observed m/z peaks at 999, 1052, 1110, and 1175 might be inferred to have charges are 20, 19, 18 and 17, respectively, because the observed peaks have ratios close to 17:18:19:20, and hence the peaks correspond to m/z peaks, with charges 20, 19, 18, and 17, of a molecule with neutral mass 20,000. In some cases, the initial estimate of charges is modified (604) based on an isotope-spacing method, where mass difference between stable isotopes are used to estimate a likely charge. For example, the one or more programs might detect m/z peaks at 999.00, 999.05, 999.10 and 999.15, and infer that the associated charge of the m/z peaks is 20 (1/0.05, where 1 is the mass difference between $C^{12}$ and $C^{13}$ and 0.05 is the spacing difference between the m/z peaks). The charge calculation can be based on any atomic isotope, including isotopes of carbon, hydrogen, nitrogen, oxygen, sulfur, chlorine, bromine and/or silicon. In some cases, the initial estimate of charges is modified (604) based on a deconvolution calculation based on one or more mass delta values corresponding to masses of the constituent(s) of different forms of the molecule of interest. Similarly, any of the calculations 602, 606 and/or 608 can use any combination of deconvolution or non-deconvolution techniques.

Thus, in some embodiments an initial estimate of the probabilities of one or more charges 602 may be calculated to have equal probability assigned bins, then the initial estimate of the probability of some or all of the charges may be modified 604, the deconvoluted masses may be calculated 606 and the probabilities of the charges recalculated 608 based on mass delta value deconvolution calculations. In some embodiments, an initial estimate of the probability of the charges 602 may be calculated to have equal probability assigned bins, the initial estimate of the charges may be modified 604 based on a mass delta value deconvolution, and the deconvoluted masses may be calculated 606 and the charges are recalculated (608) based on a peak spacing ratio deconvolution. In some embodiments, an initial estimate of the probability of the charges 602 may be calculated to have equal probability assigned bins, the initial estimate of the probability of the charges may be modified (604) based on a peak spacing ratio deconvolution, and the deconvoluted masses may be calculated (606) and the probability of the charges may be recalculated (608) based on a mass delta value deconvolution. Thus, a mass delta value deconvolution calculation can be used exclusively or as a hint or supplement to another deconvolution calculation.

Figure 7:
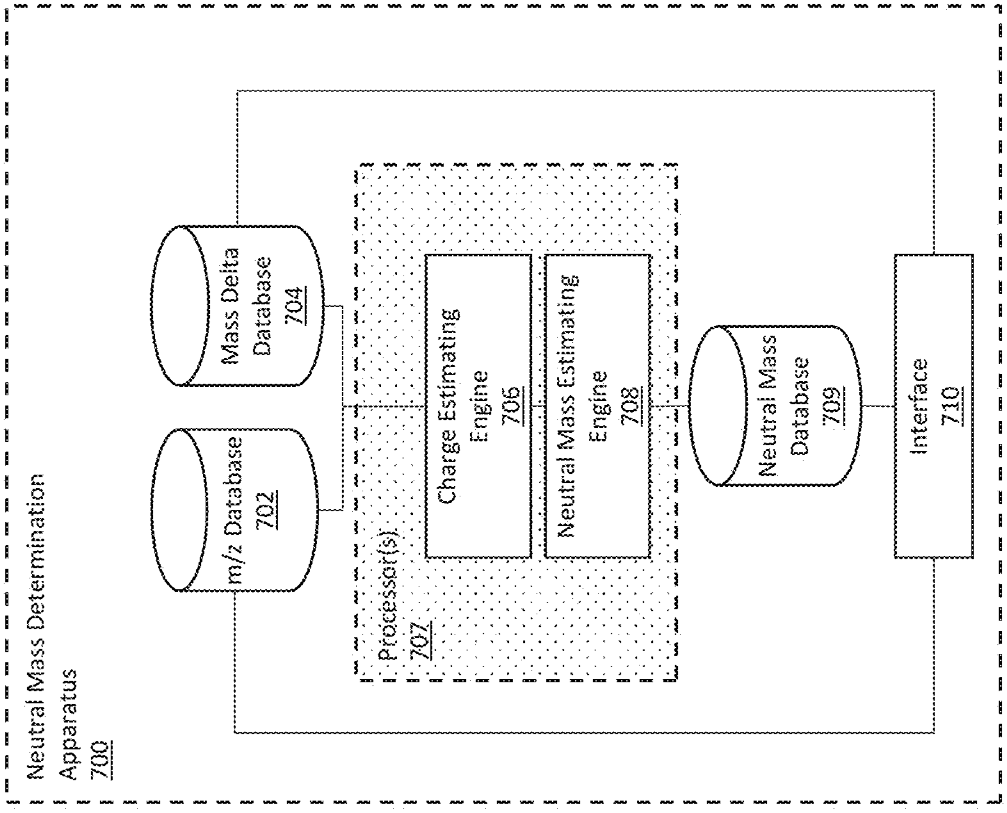
FIG. 7 shows features of a deconvolution apparatus, according to some embodiments.

FIG. 7 shows an example of a neutral mass determination apparatus 700 in accordance with some embodiments. Mass-to-charge ratio (m/z) data can be received and/or stored on one or more m/s databases 702. The m/z data may include a distribution of m/z peak values and associated m/z peak intensities for a mass spectrometry sample containing a molecule of interest. One or more mass delta values associated with one or more constituents of different forms of the molecule of interest (e.g., intact molecule or fragments thereof) can be stored on one or more mass delta databases 704. The mass delta value(s) may be provided by a user or include one or more predetermined values (e.g., associated with known constituents). In some embodiments, databases 702 and 704 are separate databases. In some embodiments, databases 702 and 704 are the same database.

The m/z spectrum data can be analyzed to determine the peak spacings between identified m/z peaks. The spacing data may be stored in the mass delta database 704, the m/z database 702 and/or a different database. The peak spacing data and mass delta data can be used to calculate an estimated charge of one or more ions using a charge estimating engine 708, which can include program instructions for executing a charge calculation. The estimated charge(s) may be stored in the mass delta database 704, the m/z database 702 and/or a different database. The estimated charge(s) can be used to estimate neutral mass(es) of species within the sample using a neutral mass estimating engine 708, which include program instructions for executing a mass calculation. The charges and/or neutral mass(es) may be provided to a user via an interface 710. The interface may be an electronic display (e.g., computer display) or a device (e.g., printer or other output device) interface. In some cases, the interface 710 may be configured to receive input, such as raw m/s spectrum data (e.g., via a computer file) and/or keyboard input from a user.

The deconvolution apparatus may be configured to accept input and/or provide output using any type of user interface. For example, a user may be able to input mass delta values via a keyboard or other user interface device. Results from a deconvolution calculation can be displayed to a user along with m/s data. For example, returning to FIG. 1, a modified m/z spectrum 100 may be provided, which indicates the estimated charges of associated with different peaks. In the m/z spectrum 100, the first cluster of peaks 110 are labeled as having estimated charges of nine (9+), a second cluster of peaks 112 are labeled as having estimated charges of ten (10+), a third cluster of peaks 114 are labeled as having estimated charges of eleven (11+), and a fourth cluster of peaks 116 are labeled as having estimated charges of twelve (12+). The m/z peaks associated with the same masses may also be marked. For example, peaks E1, E2 and E3 may be marked with the same color or label. Returning to FIG. 2, neutral mass spectrum 200 has peaks associated with different forms of the molecule of interest, which can be marked to indicate corresponding m/z peaks in the m/z spectrum (100 of FIG. 1). In this way, a user can easily identify which m/z peaks in the m/s spectrum contribute to peaks in the neutral mass spectrum. In some cases, peaks within the m/z or neutral spectra are automatically assigned (e.g., with m/z, mass and/or charge). In some cases, the user may be able to zoom in on portions of the m/z or neutral spectra to view smaller or nearly overlapping peaks.

In some cases, the deconvolution data is presented along with other data, such as chromatography data. For example, FIG. 4 shows a user interface with a chromatogram 460. The user interface may allow a user to define multiple chromatographic time windows for analysis, each with its own set of deconvolution parameters, allowing automated analysis of single samples or comparison between many samples. The user interface may include tables and/or figures showing side-by-side comparisons of assigned mass peaks and intensities from multiple samples.

The deconvolution methods and apparatus described herein may improve upon previous deconvolution techniques by relying on one or more mass delta values corresponding to the masses of possible constituent(s) of a molecule. The methods can depend at least in part on forms of the molecule having different amounts of the constituent(s) becoming ionized during mass spectrometry analysis. Using one or more mass delta values can result in more accurate deconvolution results and uses less memory than previous deconvolution techniques. The deconvolution calculation can be performed through an iterative mathematical operation, with each iterative calculation relying on the one or more mass delta values alone or in combination with other deconvolution techniques.

According to some embodiments, the deconvolution methods described herein amount to more than only mathematical operations. For example, one or more processors 707 can be used to generate neutral mass information, which can be the stored in a neutral mass database 709. As another example, m/z data can be stored in an m/z database 702 and mass delta value(s) can be stored in a mass delta value database 704. Thus, the methods can include using a processor and memory to perform steps of calculating a mathematical operation and receiving and storing data.

Any of the methods and apparatuses described herein may also include step(s) of comparing the mass delta value(s) to an m/z data to transform the m/z data to estimated neutral mass information. In some cases, the estimated neutral mass information is converted to a neutral mass spectrum. Thus, such steps can tie the deconvolution mathematical operation to the ability of the one or more processors to process neutral mass information by improving the accuracy to which the processor(s) can provide the neutral mass information. The methods can include combining step(s) of generating neutral mass information with step(s) for comparing the mass delta value to the mass-to-charge ratio data. Therefore, the methods can go beyond simply retrieving and combining data using a computer. That is, the methods are not merely performing routine data receipt and storage or mathematical operations on a computer, but rather is an innovation in computer technology, namely mass spectrometry data processing, which in this case reflects both an improvement in the functioning of a computer and an improvement in mass spectrometry data analysis.

The methods described herein (including any user interface implementing them) may apply the deconvolution of charge states to transform m/z spectra to mass spectra (e.g., neutral mass spectra).

Examples

An iterative algorithm may be used to deduce the mix of charges in each small interval of an m/z spectrum. All charge values may be set equally likely for the first deconvolved mass spectrum; new charge values may then be computed from the previous deconvolved mass spectrum, and the process may be repeated.

Figure 8A:
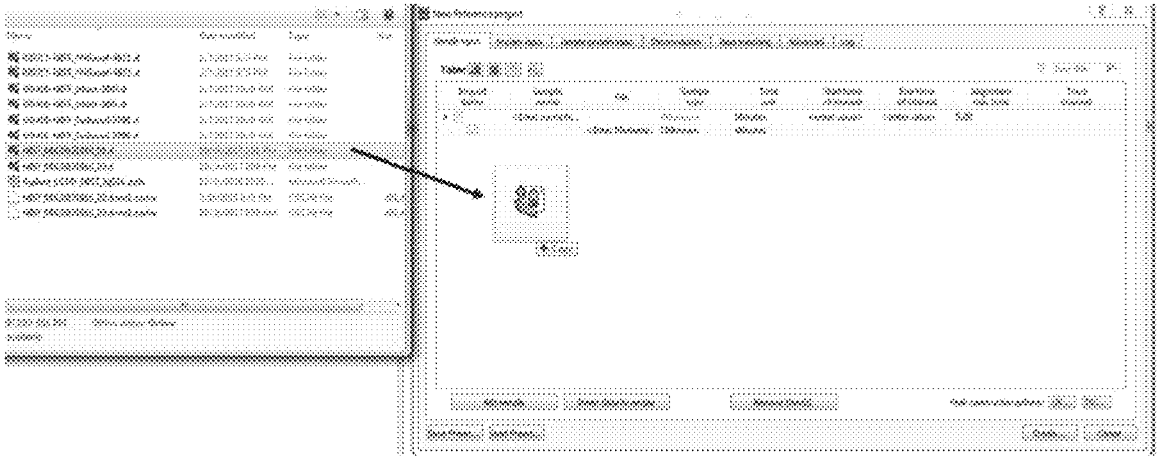
FIG. 8A is an example of a user interface for an apparatus including the deconvolution process as described herein.
Figure 8B:
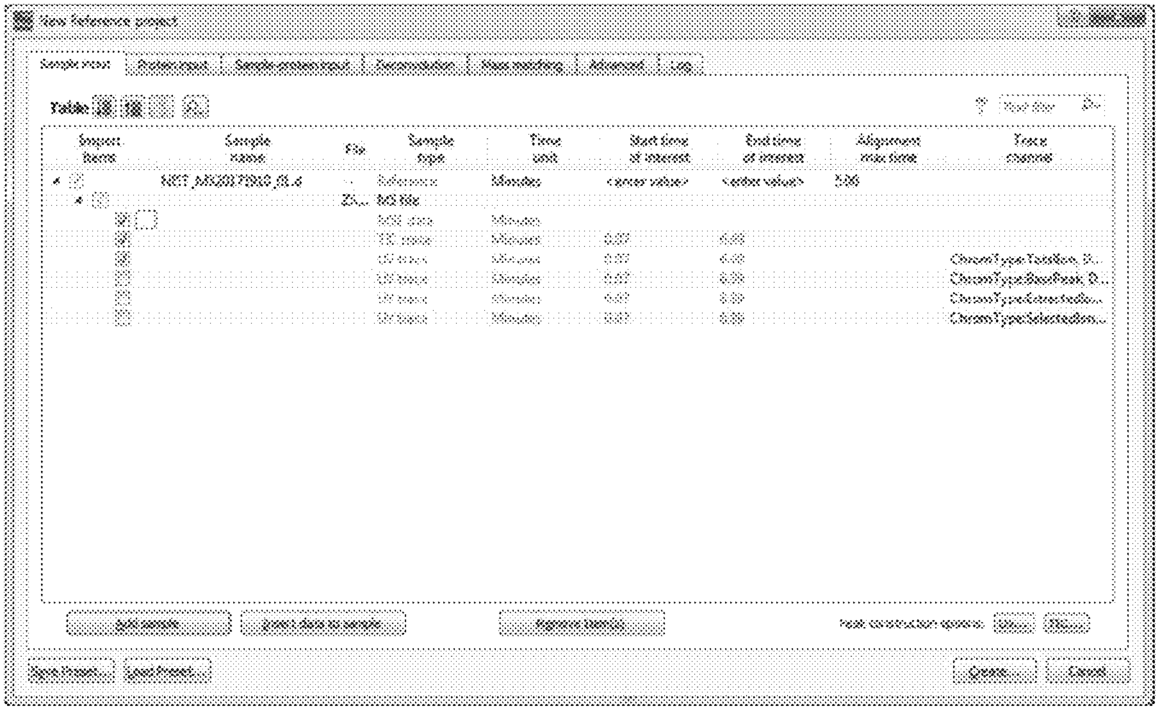
FIG. 8B is another example of a user interface for an apparatus as described herein.
Figure 9B:
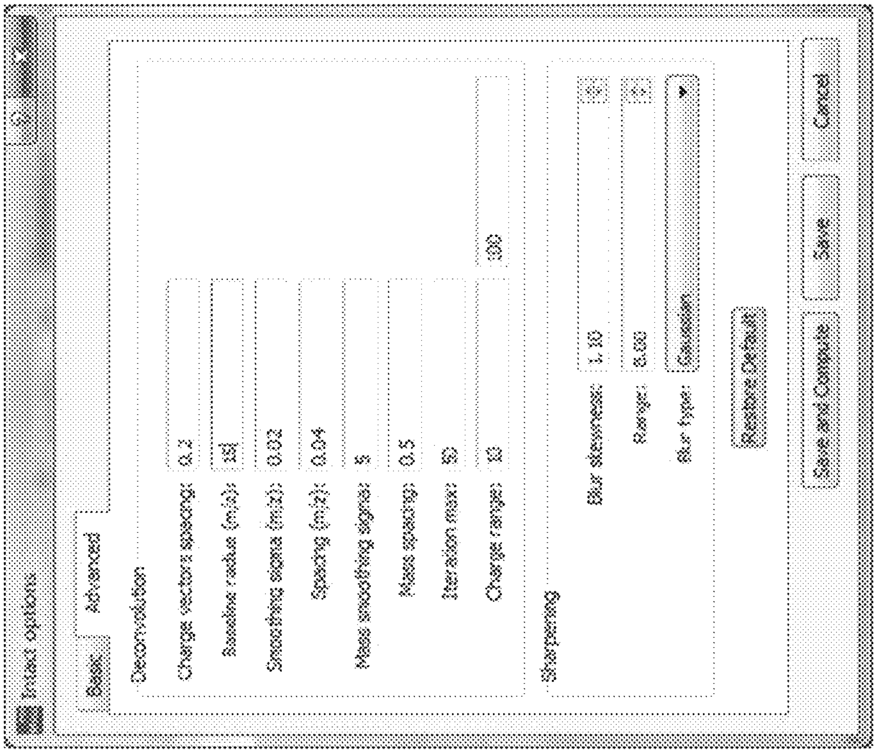
FIGS. 9A-9B illustrate a user interface showing various parameters for processing, as described herein.
Figure 9A:
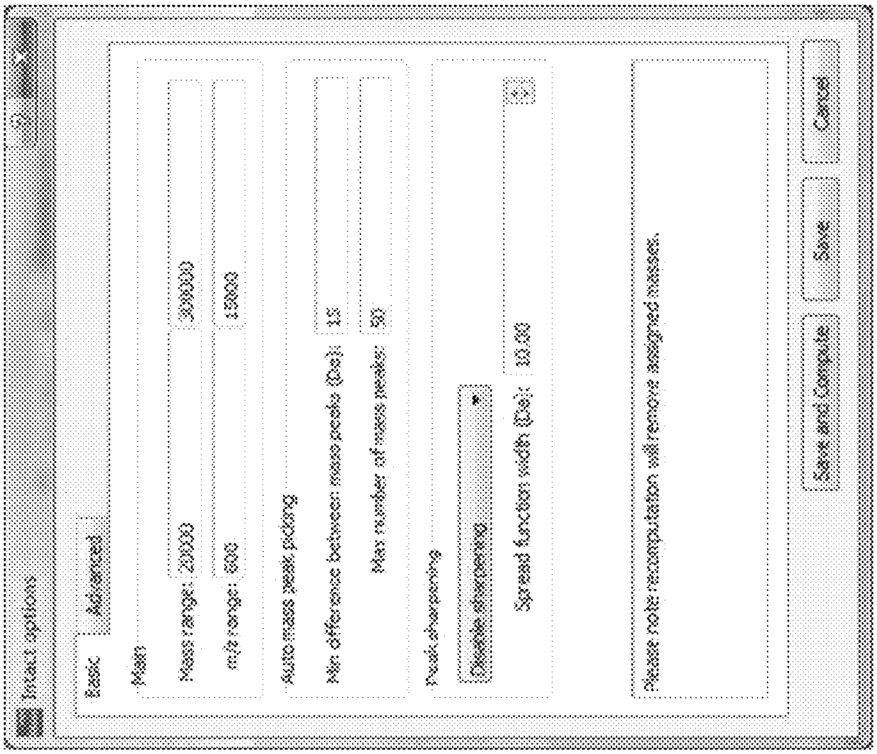

In some variations, the software applies a small "parsimony" bias against m/z intervals with many different charges, because multiple true masses mapping to the same m/z bin are less common than deconvolution artifacts caused by charge uncertainty. On each iteration, the algorithm may update the charge vectors, which may provide probabilities for each charge at each point of the observed m/z spectrum. New charge vectors may be determined by the last deconvolved mass spectrum along with a priori assumptions about smoothness of charging and likelihood of mass coincidences. The new charge vectors may give a new deconvolved mass spectrum, and each iteration may reduce the sum of the squares of the differences between the observed m/z spectrum and the m/z spectrum computed from the last set of charge vectors and deconvolved mass spectrum. For polydisperse targets such as nanodiscs, the algorithm can incorporate a user defined comb filter. For example, 677.5 Da may be used to describe the delta mass for a nanodisc lipid containing dimyristoylphosphocholine. Native and denaturing MS deconvolution was performed using software as described above. Raw unprocessed MS data files may be dragged directly into a Create Project User Interface (see, e.g., FIGS. 8A-8B). FIGS. 9A-9B shows a more detailed description of advanced deconvolution parameters as described herein.

FIGS. 9A and 9B show illustrate basic and advanced deconvolution parameters. Typically, for native-MS nESI acquisitions when the S/N and overall signal is lower than that achieved through traditional denaturing LC-MS experiments, the Mass Sigma Smoothing option is generally increased to 25-50.

Basic deconvolution values used for spectral processing in these examples were typically: Mass Range 20,000-300,000 (and up to 1,000,000 for GroEL). The lower MW range may be reduced for smaller proteins; e.g., m/z range 600-15,000; Charge Range 10-100; Iteration Max 50.

In some variations, a method (or software performing the method) may resample the input MS spectra, which typically have wider m/z spacing at higher m/z, to produce uniformly sampled MS spectra. The spacing for the uniformly sampled spectra can be set by the user, typically about equal to the finest spacing in the input spectra, for example, 0.01 Thomsons, and resampling uses linear interpolation to determine values at m/z's between input sample points. The method or apparatus may then use an iterative algorithm to deduce the mix of charges (the "charge vector") in each small interval of the uniformly sampled m/z spectrum. Intervals are typically set to about 0.6 Thomson ("charge vectors spacing") to match the isotope spread of a large highly charged molecule, but generally any value from 0.2 to 2 works equally well. For each interval, all charge probabilities are set equally likely for the first deconvolved mass spectrum.

On each iteration, the algorithm updates "charge vectors" c_i (z), which give the probabilities that the i-th point (x_i, y_i) in the observed m/z spectrum takes the charges z=1, 2, . . . , up to some maximum user defined charge. The charge vectors give the new neutral mass spectrum by accumulating c_i(z)*y_i values into the mass spectrum at the points closest to z*x_i−z*1.0073, where 1.0073 is the mass of a proton. New charge vectors are determined by a function that blends the intensity of the latest mass spectrum at z*x_i−z*1.0073 with a bonus for smooth charging of points in the neutral mass spectrum, and a "parsimony" penalty for charge vectors with probability spread over many charges. The method or apparatus may then apply this "parsimony" bias, because multiple true masses mapping to the same m/z bin are less common than deconvolution artifacts caused by charge uncertainty. These bias down-weights the probability for each charge, except the likeliest charge. The smooth charging bonus can also be applied directly to the charge vectors (rather than to the neutral mass spectrum) by comparing c_i(z) with c_h(z) where c_h is the charge vector for point (x_h, y_h) satisfying x_h=(z−1)*(x_i−1.0072)/z and also with c_j(z) where c_j is the charge vector for (xj, yj) satisfying x_j=(z+1)*(x_i−1.0073)/z. To bonus for smoothness, c_i(z) is increased if c_h(z) and c_j(z) are both significantly larger than zero. After applying parsimony and/or smooth charging biases, charge vectors must be renormalized so that for each i, c_i(z) sums to one over all choices of z. For each i the intensity at m/z point mi is more likely to derive from a single mass value than from two masses, more likely to derive from two masses than from three, and so forth. Many implementations of the parsimony idea seem to work well to speed up convergence and reduce artifacts relative to the same iterative algorithm without parsimony.

For example, one implementation uses a schedule of multipliers: 1, c, c2, c3, c4, . . . , where c<1 and ck−1 gives a priori probability that k distinct masses will all land at the same m/z. The k-th largest mass contributing to mi has its charge probability adjusted by multiplying by ck−1. After multiplication, charge probabilities are normalized to sum to 1. The value of c was picked based on what is believed to be the best results on a training set.

For polydisperse targets such as nanodiscs, the software may use a comb filter to set charge probabilities for m/z value x based on the probabilities at x±j x KnownMassDelta, for j=0, 1, . . . , CombFilter, where CombFilter is a user-supplied width (number of "teeth") for the comb filter, and KnownMassDelta is a user-supplied mass delta for the repeating units, for example, 677.5 Da for a nanodisc lipid. The comb filter was added in what may be referred to as a "backwards step". A comb filter of width 1 is implemented as an averaging filter with weights 0.25, 0.5, 0.25 applied to points in the last neutral mass spectrum at masses m−Δ, m, and m+Δ. The averaged value is then used to set the probability for charge k at m/z point mi=1.0073+m/k. A comb filter of width 2 uses a weighted average of m−2Δ, m−Δ, m, m+Δ, and m+2Δ. The software allows multiple comb filters of various widths to accommodate multiple expected mass deltas. One set that works well for many glycoproteins is 291.3 (for NeuAc), 365.3 (for HexNAc-Hex), and 656.6 (for HexNAc-Hex-NeuAc), all with width 1.

In some variations, the method or apparatus (e.g., software performing the method) for intact mass analysis has only three filters: a Gaussian smoothing filter optionally applied to the input m/z spectrum, a Gaussian smoothing filter optionally applied to the m spectrum after the iterative algorithm has finished, and the comb filter described above applied within the iterations. Deconvolution can also be performed on text (m/z versus intensity) and csv files. These methods and apparatuses may be used with synthetic and semi-synthetic spectra.

The use of a parsimonious deconvolution algorithm has been demonstrated to efficiently deconvolute spectral data acquired for proteins and complexes, both pharmaceutically relevant constructs and research grade standards, analyzed under native-MS and denaturing conditions (LC-MS) under both positive and negative modes of ionization. MS data from three different analyzers (oa-ToF, Orbitrap, and FTICR) and four different instrument vendors (Waters, ThermoScientific, Agilent, and Bruker) were successfully deconvoluted without any file format change. The proteins and complexes analyzed varied in MW, stoichiometry, and m/z range: the NIST IgG1k (mAb, 148.3 kDa); an IgG1-biotin conjugate (ADC-like; 146.5 kDa); IgG1-PEG-Biotin (ADC-like; 147.5 kDa); a PEG-GCSF (39.9 kDa; up to 43 measurable PEG 20k units); an empty MSP1D1 nanodisc (141.5 kDa; two membrane scaffold proteins, approximately 124 to 170 measurable DMPC phospholipid molecules); the membrane protein AqpZ (noncovalent homotetramer, 97.5 kDa); the chaperone protein complex GroEL (homotetradecameric, 802.4 kDa). Highly comparable deconvolution parameters were used in all cases, and the resultant zero-charged spectra are artifact free (zero harmonics; third, half, double, and triple multiples of the protein MW).

Additionally, when processing denatured LC-MS or native-MS spectral data (of the same constructs, NIST IgG1k and the IgG1-biotin conjugate), the deconvolution parameters remained constant and unchanged. In both cases, the deconvolved, zero-charged data peak widths consistently reflect those of the unprocessed data. Mass accuracy is also highly comparable. From an industrial and biopharmaceutical perspective, the methods and apparatuses described herein may be highly advantageous, as most laboratories within a research discovery and process development setting will likely use multiple MS instruments from different vendors; the ability to drag-and-drop multiple MS data files of different formats and subsequently process them is highly attractive. Also, in certain cases, it may be required that both denaturing and native-MS analyses be performed on the same protein construct. For example, one may want to derive an accurate mAb MW through LC-MS analysis, levels of specific covalent modification from high throughput screening campaign, or a drug-to-antibody ratio or assess the levels of degradation of biotherapeutic molecules or the levels of aggregation (by SEC coupled to native-MS) present in the sample. Native-MS in biopharma is also used for assessing the correct assembly of a nanodisc; it is rapid (e.g., 5 min), and when combined with rapid and accurate deconvolution, one can accurately assess the level of DMPC incorporation and therefore ascertain its correct formation for further downstream manipulation of membrane proteins, for example, SPR dose dependence experiments. In summary, the methods an apparatuses described herein can be used for protein deconvolution within the pharmaceutical research environment, therefore removing much of the subjectivity that still exists in this most basic area of MS analytics.

Additional examples of the methods and apparatuses (e.g., software) described herein are described in "Native and Denaturing MS Protein Deconvolution for Biopharma: Monoclonal Antibodies and Antibody-Drug Conjugates to Polydisperse Membrane Proteins and Beyond" by Campuzano et al. (*Anal. Chem.* 2019, 91, 9472-7480), which is herein incorporated by reference in its entirety.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for generating a neutral mass spectrum, the method comprising:

receiving, in a processor, a mass-to-charge ratio (m/z) spectrometry data for a molecule, wherein the m/z spectrometry data includes a plurality of mass-to-charge peaks corresponding to a plurality of ions or fragments of the molecule;

providing estimated charges and a probability of charges for the plurality of ions or fragments of the molecule from the m/z spectrometry data;

calculating deconvoluted masses based on the estimated charges and the probability of charges, wherein the deconvoluted masses are calculated using mass delta values corresponding to masses of known constituents of the molecule;

recalculating the probability of charges for the plurality of ions or fragments of the molecule based on the deconvoluted masses;

determining that the deconvoluted masses and the recalculated probability of charges for the plurality of ions or fragments of the molecule converge with the plurality of mass-to-charge peaks of the m/z spectrometry data; and generating the neutral mass spectrum using the deconvoluted masses and the recalculated probability of charges for the plurality of ions or fragments of the molecule.

2. The computer-implemented method of claim 1, wherein providing the estimated charges and the probability of charges for the plurality of ions or fragments comprises:

providing an initial estimate of probability of charges for the plurality of ions or fragments to have equal probability; and modifying the initial estimate of probability of charges for the plurality of ions or fragments based on a peak spacing ratio deconvolution, wherein the peak spacing ratio deconvolution includes determining integer ratios among the plurality of mass-to-charge peaks corresponding to differently charged ions of the same mass.

3. The computer-implemented method of claim 1, wherein providing the estimated charges and the probability of charges for the plurality of ions or fragments comprises:

providing an initial estimate of probability of charges for the plurality of ions or fragments to have equal probability; and modifying the initial estimate of probability of charges for the plurality of ions or fragments using the mass delta values.

4. The computer-implemented method of claim 1, further comprising iteratively calculating the deconvoluted masses and recalculating the probability of charges for the plurality of ions or fragments of the molecule until they converge with the plurality of mass-to-charge peaks of the m/z spectrometry data.

5. The computer-implemented method of claim 1, wherein the mass delta values are selected from a listing of a plurality of mass delta values.

6. The computer-implemented method of claim 5, further comprising generating the listing of the plurality of mass delta values to a user.

7. The computer-implemented method of claim 5, wherein the listing of the plurality of mass delta values includes a mass delta for one or more of: a sodium adduct, phosphorylation, a 6-carbon sugar, a glucose, and a trisaccharide.

8. A computer-implemented method for generating a neutral mass spectrum, the method comprising:

receiving, in a processor, a mass-to-charge ratio (m/z) spectrometry data for a molecule, wherein the m/z spectrometry data includes a plurality of mass-to-charge peaks corresponding to a plurality of ions or fragments of the molecule;

providing estimated charges and a probability of charges for the plurality of ions or fragments of the molecule from the m/z spectrometry data;

calculating deconvoluted masses based on the estimated charges and the probability of charges, wherein the deconvoluted masses are calculated using mass delta values corresponding to masses of known constituents of the molecule;

recalculating the probability of charges for the plurality of ions or fragments of the molecule based on the deconvoluted masses, wherein the calculating and the recalculating are done iteratively until the deconvoluted masses and the recalculated probability of charges for the plurality of ions or fragments of the molecule converge with the plurality of mass-to-charge peaks of the m/z spectrometry data; and generating the neutral mass spectrum using the deconvoluted masses and the recalculated probability of charges for the plurality of ions or fragments of the molecule.

9. The computer-implemented method of claim 8, wherein providing the estimated charges and the probability of charges for the plurality of ions or fragments comprises:

providing an initial estimate of probability of charges for the plurality of ions or fragments to have equal probability; and modifying the initial estimate of probability of charges for the plurality of ions or fragments based on a peak spacing ratio deconvolution, wherein the peak spacing ratio deconvolution includes determining integer ratios among the plurality of mass-to-charge peaks corresponding to differently charged ions of the same mass.

10. The computer-implemented method of claim 8, wherein providing the estimated charges and the probability of charges for the plurality of ions or fragments comprises:

providing an initial estimate of probability of charges for the plurality of ions or fragments to have equal probability; and modifying the initial estimate of probability of charges for the plurality of ions or fragments using the mass delta values.

11. The computer-implemented method of claim 8, wherein the mass delta values include a mass delta for one or more of: a sodium adduct, phosphorylation, a 6-carbon sugar, a glucose, and a trisaccharide.

12. A non-transitory computer-readable medium with instructions stored thereon, that when executed by a processor, cause the processor to:

receive, in the processor, a mass-to-charge ratio (m/z) spectrometry data for a molecule, wherein the m/z spectrometry data includes a plurality of mass-to-charge peaks corresponding to a plurality of ions or fragments of the molecule;

providing estimated charges and a probability of charges for the plurality of ions or fragments of the molecule from the m/z spectrometry data;

calculate deconvoluted masses based on the estimated charges and the probability of charges, wherein the deconvoluted masses are calculated using mass delta values corresponding to masses of known constituents of the molecule; and recalculate the probability of charges for the plurality of ions or fragments of the molecule based on the deconvoluted masses, wherein the calculating and the recalculating are done iteratively until the deconvoluted masses and the recalculated probability of charges for the plurality of ions or fragments of the molecule converge with the plurality of mass-to-charge peaks of the m/z spectrometry data; and generate a neutral mass spectrum using the deconvoluted masses and the recalculated probability of charges for the plurality of ions or fragments of the molecule.

13. The non-transitory computer-readable medium of claim 12, wherein providing the estimated charges and the probability of charges for the plurality of ions or fragments comprises:

providing an initial estimate of probability of charges for the plurality of ions or fragments to have equal probability; and modifying the initial estimate of probability of charges for the plurality of ions or fragments based on a peak spacing ratio deconvolution, wherein the peak spacing ratio deconvolution includes determining integer ratios among the plurality of mass-to-charge peaks corresponding to differently charged ions of the same mass.

14. The non-transitory computer-readable medium of claim 12, wherein providing the estimated charges and the probability of charges for the plurality of ions or fragments comprises:

providing an initial estimate of probability of charges for the plurality of ions or fragments to have equal probability; and modifying the initial estimate of probability of charges for the plurality of ions or fragments using the mass delta values.

15. The non-transitory computer-readable medium of claim 12, wherein the mass delta values are selected from a listing of a plurality of mass delta values.

16. The non-transitory computer-readable medium of claim 15, further comprising generating the listing of the plurality of mass delta values to a user.

17. The non-transitory computer-readable medium of claim 12, wherein the mass delta values include a mass delta for one or more of: a sodium adduct, phosphorylation, a 6-carbon sugar, a glucose, and a trisaccharide.

18. A system for providing a neutral mass spectrum associated with a molecule from mass spectrometry data, the system comprising:

one or more processors; and memory coupled to the one or more processors, the memory configured to store computer-program instructions, that, when executed by the one or more processors, perform a computer-implemented method comprising:

receiving, in a processor, a mass-to-charge ratio (m/z) spectrometry data for the molecule, wherein the m/z spectrometry data includes a plurality of mass-to-charge peaks corresponding to a plurality of ions or fragments of the molecule;

providing estimated charges and a probability of charges for the plurality of ions or fragments of the molecule from the m/z spectrometry data;

calculating deconvoluted masses based on the estimated charges and the probability of charges, wherein the deconvoluted masses are calculated using mass delta values corresponding to masses of known constituents of the molecule;

recalculating the probability of charges for the plurality of ions or fragments of the molecule based on the deconvoluted masses, wherein the calculating and the recalculating are done iteratively until the deconvoluted masses and the recalculated probability of charges for the plurality of ions or fragments of the molecule converge with the plurality of mass-to-charge peaks of the m/z spectrometry data; and generating the neutral mass spectrum using the deconvoluted masses and the recalculated probability of charges for the plurality of ions or fragments of the molecule.

19. The system of claim 18, wherein providing the estimated charges and the probability of charges for the plurality of ions or fragments comprises:

providing an initial estimate of probability of charges for the plurality of ions or fragments; and modifying the initial estimate of probability of charges for the plurality of ions or fragments using:

the mass delta values; or a peak spacing ratio deconvolution, wherein the peak spacing ratio deconvolution includes determining integer ratios among the plurality of mass-to-charge peaks corresponding to differently charged ions of the same mass.

20. The system of claim 19, wherein the initial estimate of probability of charges for the plurality of ions or fragments is calculated to have equal probability for each of the plurality of ions or fragments.

* * * * *